United States Patent [19]

Masaki

[11] Patent Number: 5,642,168
[45] Date of Patent: Jun. 24, 1997

[54] HIGH RESOLUTION PICTURE IMAGE PROCESSING METHOD AND SYSTEM

[75] Inventor: Toshimichi Masaki, Osaka, Japan

[73] Assignee: Omron Corporation, Japan

[21] Appl. No.: 551,912

[22] Filed: Oct. 23, 1995

[30]     Foreign Application Priority Data

Oct. 26, 1994  [JP]  Japan .................................. 6-287296

[51] Int. Cl.⁶ ........................................................ H04N 5/262
[52] U.S. Cl. .......................... 348/441; 348/445; 348/458; 348/222
[58] Field of Search ................................. 348/474, 441, 348/390, 399, 46, 87, 207, 222, 234, 445, 446, 458; H04N 5/26

[56]                 References Cited

U.S. PATENT DOCUMENTS

| | | | |
|---|---|---|---|
| 4,449,143 | 5/1984 | Dischert et al. | 348/441 |
| 4,660,096 | 4/1987 | Arlan et al. | 358/310 |
| 4,916,525 | 4/1990 | Drummond | 358/12 |
| 5,159,460 | 10/1992 | Senso | 348/441 |
| 5,264,939 | 11/1993 | Chang | 358/213.22 |
| 5,530,484 | 6/1996 | Bhatt et al. | 348/441 |

*Primary Examiner*—Glenton B. Burgess
*Attorney, Agent, or Firm*—Dickstein Shapiro Morin & Oshinsky LLP

[57]                 ABSTRACT

A picture processing system capable of processing a high resolution picture by a conventional picture processor, in which a picture converter is interposed between a camera producing a high resolution picture and a picture processor processing a general purpose picture signal, the picture processor applies coordinates (Xs, Ys) of a specific picture element and sampling intervals about picture element in X and Y axial directions to the picture converter upon the entry of the high resolution picture produced by the camera to the picture converter, the picture converter receives synchronizing signals and a horizontal blanking signal which are produced in the picture processor and subsequently extracts a predetermined picture element data based on the designated data in accordance with the timing of respective signals, and the extracted picture element data is converted to analog general purpose picture signal for application to the picture processor, which is processed by a conventional picture processing method.

18 Claims, 7 Drawing Sheets

HIGH RESOLUTION PICTURE IMAGE PROCESSING METHOD AND SYSTEM

BACKGROUND OF THE INVENTION

1. Field of the Invention

This invention relates to a picture processing method and a picture processing system for applying to a picture processor a picture picked-up by a camera such as a television camera about an object to execute a predetermined operation, and more particularly to an improved method and a system employing the method for processing a picture having a high resolution exceeding the processing capability of the picture processor.

2. Discussion of the Related Art

It is well known that an inspection about a mounting status of electronic components mounted on a printed circuit board which is difficult to be judged by the naked eye is automatically executed by applying a picture of an object picked up by a television camera to a picture processor for processing. The picture processor is subject to a NTSC (National Television System Committee) method, and generally processes a picture image having a resolution of 512 picture elements in an X-axial direction and 484 picture elements in a Y-axial direction. This type of picture processor is employed in various fields, and various software products are developed for quick and precise picture processing. There recently have been developed cameras producing a higher resolution picture than the picture processed by the conventional picture processor. The recently developed camera may produce a picture having several dozen times of resolution in comparison with a conventional camera, and provide a detailed inspection by picking up detailed picture data even if the object is a microscopic object such as intervals of leads of a QFP (quad flat package) mounted on a printed circuit board.

It is impossible for the conventional picture processor to process such a high resolution picture. For such a high resolution picture, a new exclusive unit must be developed and be installed by a program utilizing a software developed for the conventional picture processor. The development of the exclusive unit and the installation of the program consumes enormous labor and time, and is very costly.

SUMMARY OF THE INVENTION

It is, therefore, a primary object of this invention to provide an improved picture processing method and system capable of processing a high resolution picture utilizing a conventional picture processor at fairly reduced labor, time and cost.

According to a first aspect of this invention, there is provided a method for processing a high resolution picture having a higher resolution than a predetermined resolution of a picture which can be processed by a picture processor, in which a specific picture element and a sampling interval for extracting a predetermined picture element within the high resolution picture are designated, and the picture processor processes a picture obtained by extracting based on the designated sampling interval picture data including the specific picture element and the corresponding number of picture elements to the predetermined resolution from high resolution picture data.

According to this picture processing method, as the specific picture element and the sampling intervals are designated for extracting the predetermined picture element within the high resolution picture, picture data including the specific picture element and the number of picture elements that can be processed by the picture processor are extracted from the high resolution picture data according to the contents of the designation. When the sampling interval is wide, a low resolution picture over broad range is obtained. When it is narrow, a detailed picture in a specific small section is obtained. In either case the pictures may be processed by a conventional picture processor.

Since the picture data having the number of picture elements which can be processed by the picture processor is extracted to be processed from the high resolution picture data by designating the specific picture element and the sampling interval for extracting the predetermined picture element within the high resolution picture, the picture data with desired accuracy is extracted from the high resolution picture and may be processed by the conventional picture processor, so that high resolution pictures may be processed by conventional devices and software products as they are.

According to a second aspect of this invention, there is provided a picture processing system including a picture processor for processing a picture having a predetermined resolution, and a picture converter for producing picture data having the predetermined resolution from picture data having a higher resolution than the predetermined resolution to be applied to the picture processor. The picture processor includes a designating means for designating a specific picture element and a sampling interval to extract a predetermined picture element within the high resolution picture. The picture converter includes a picture input means for entering the high resolution picture, a storage means for storing the high resolution picture entered by the picture input means, a picture converting means for extracting picture data including the specific picture element and the corresponding number of picture elements to the predetermined resolution based on the sampling interval designated by the designating means of the picture processor to produce a picture of an object to be processed, and a picture output means for applying the picture produced by the picture converting means to the picture processor.

The specific picture element and the sampling interval are designated by the picture processor about the high resolution picture entered into the picture converter. Based on the designated data the picture converter extracts picture data including the specific picture element and the number of picture elements that can be processed by the picture processor, and the extracted data is applied to the picture processor.

According to a third aspect of this invention, there is provided a picture processing system including a picture processor for processing a picture having a predetermined resolution, a camera for producing a picture having a higher resolution than the predetermined resolution, and a picture converter interposed between the picture processor and the camera, the picture processor including a designating means for designating a specific picture element and a sampling interval to extract a predetermined picture element within the picture produced by the camera. The picture converter includes a picture input means for entering the high resolution picture from the camera, a storage means for storing the high resolution picture entered by the picture input means, a picture converting means for extracting picture data including the specific picture element and the corresponding number of picture elements to the predetermined resolution based on the sampling interval designated by the designating means of the picture processor about a picture stored in the storage means to produce a picture of an object to be processed, and a picture output means for applying the picture produced by the picture converting means to the picture processor.

The high resolution picture from the camera is entered into the picture converter. The picture converter extracts picture data having the number of picture elements that can be processed by the picture processor based on the specific picture element and the sampling interval designated by the picture processor, and applies the extracted data to the picture processor.

In the system of the second and the third aspects of this invention, the extracting operation of the picture data is executed within the picture converter by entering a high resolution picture into the picture converter and designating the specific picture element and the sampling interval of the predetermined picture element within the high resolution picture by the picture processor, so that only the picture converter is necessary to be developed as a means for processing the high resolution picture and the labor and cost for developing devices and software products can be fairly reduced.

According to a fourth aspect of this invention, the storage means of the picture converter stores each picture element of the high resolution picture with the correspondence of picture element data to a picture element position, and the picture entering means is further provided with a picture element data extracting means for subsequently extracting picture element data of each picture element from the high resolution picture produced by the camera, a position data producing means for producing position data of each picture element in accordance with the extracting operation of the picture element data extracting means, and an output means for simultaneously applying to the storage means the picture element data extracted by the picture element data extracting means and the position data produced by the position data producing means.

In the picture converter, the picture element data of the respective picture elements of the high resolution picture is subsequently extracted, the position data corresponding to the respective picture element data is subsequently produced, and both of the data are simultaneously stored in the storage means. Accordingly, it is possible to read high resolution picture data from the camera and apply the read data to the picture converter for picture processing.

According to a fifth aspect of this invention, the picture processor is further provided with a synchronizing signal producing means for generating horizontal and vertical synchronizing signals, and the picture converting means of the picture converter is further provided with a synchronizing signal input means for entering the synchronizing signals generated by the synchronizing signal producing means, a position data producing means for subsequently producing position data of the respective picture elements based on the specific picture elements and the sampling intervals designated by the designating means in accordance with the entered synchronizing signals, and a picture element extracting means for subsequently extracting picture element data based on the respectively produced position data from the storage means.

The picture converter subsequently produces position data for the respective picture elements based on the specific picture element and the sampling interval according to the synchronizing signal produced by the picture processor and subsequently extracts the picture element data defined by the respective position data to be applied to the picture processor, in which the picture data having the number of picture elements corresponding to the its processing capability is subsequently entered into the picture processor in accordance with the timing of a picture processing operation. Thus, the picture data having the number of the picture elements in accordance with the processing capability of the picture processor can be easily extracted and the picture processing with good efficiency can be performed by subsequently entering the respective picture element data in accordance with the timing of the picture processing operation.

According to a sixth aspect of this invention, the camera, the picture converter and the picture processor are installed into a board inspection device for inspecting a mounting status of electronic components mounted on a printed circuit board.

The electronic components on the printed circuit board are picked up by the camera and the mounting status of the components is inspected by utilizing the picked up high resolution picture. The conventional picture processor may be employed to precisely inspect the mounting condition of the components.

BRIEF DESCRIPTION OF THE DRAWINGS

Other objectives and advantages of this invention will be more readily apparent from the following detailed description provided in conjunction with the following figures, of which.

DETAILED DESCRIPTION OF THE INVENTION

Figure 1:
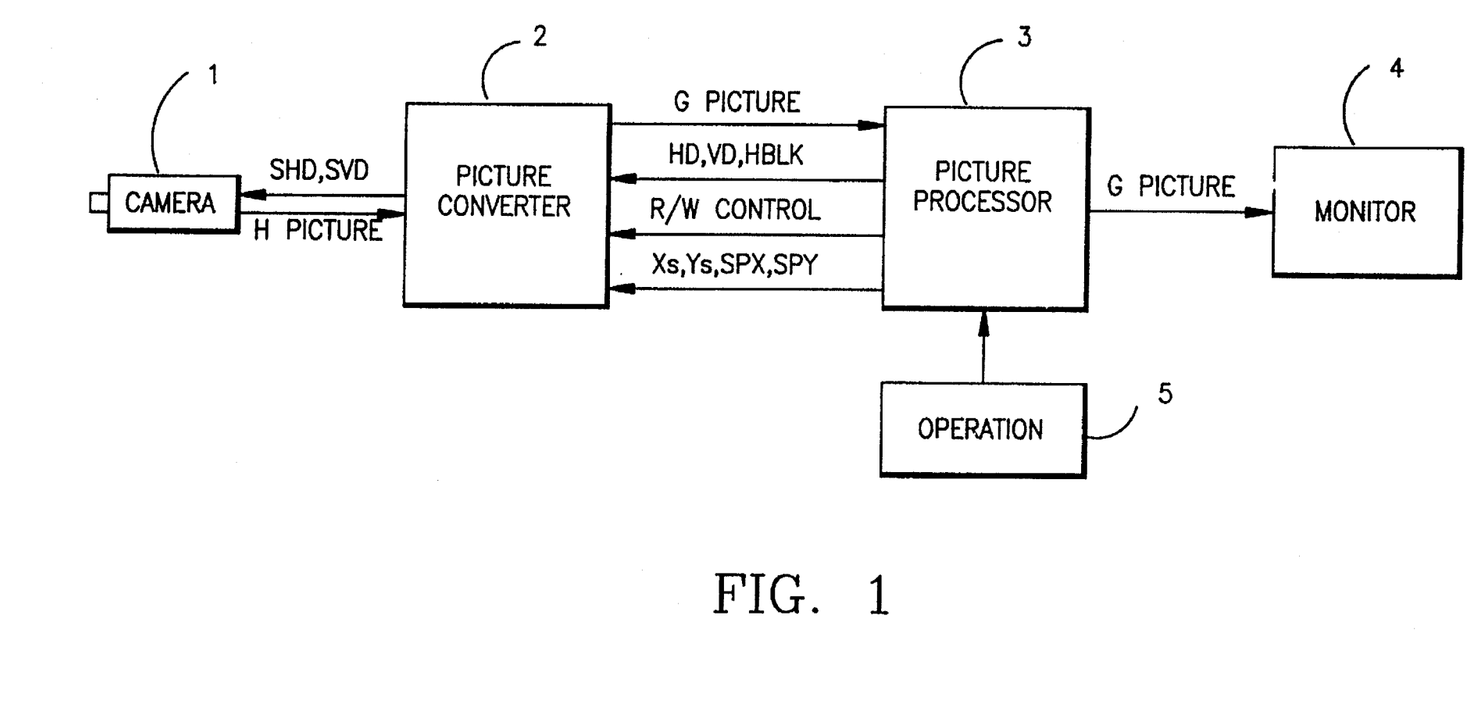
FIG. 1 is a block diagram of a picture processing system as a preferred embodiment of this invention.
Figure 2:
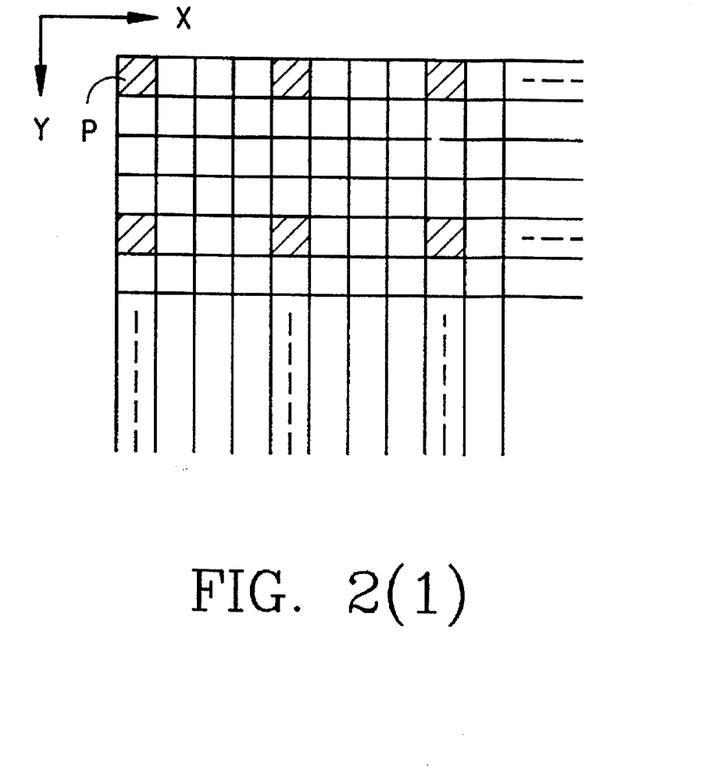
FIG. 2 illustrates one example of a sampling interval for extracting a picture element.

Referring, now, to FIG. 1, there is shown a block diagram of a picture processing system for inspecting a mounting status of components mounted on a printed circuit board as a preferred embodiment of this invention, which includes a high resolution camera 1, a picture converter 2, a picture processor 3, a monitor 4, and an operation unit 5.

The high resolution camera 1 is designed to produce a picture having 4096 picture elements in an X axial direction and 3872 picture elements in Y axial direction. The camera 2 receives a synchronizing signal in a horizontal direction SHD and a synchronizing signal in a vertical direction SVD which are produced in the picture converter 2, and applies a high resolution picture signal (H PICTURE) to the picture converter 2. The converter 2 converts the high resolution picture signal into a general purpose picture signal (G PICTURE) which is a video signal of a RS-170 type signal in a conventional NTSC method, which will be described later.

The picture processor 3 employing a conventional construction for processing the general purpose picture signal digitally processes the general purpose picture signal G PICTURE from the picture converter 2, and executes a predetermined process such as extraction of characteristic quantity and judgement of good or bad about an object.

The monitor 4 is designed to receive a general purpose picture signal, and displays a converted picture entered into the picture processor 3 or a result of the picture processing.

The operation unit 5 is disposed to actuate an input operation of various commands for picture processing.

The picture converter 2 converts a digital picture produced by extracting 512 picture elements in an X axial direction and 484 picture elements in a Y axial direction about a high resolution picture picked-up by the camera 1 to the above-mentioned general purpose picture signal to be applied to the picture processor 3. The processor 3 instructs the picture converter 2 to designate specifies coordinates (Xs, Ys) of a predetermined picture element within a high resolution picture as data to specify a picture element to be extracted, and designate sampling intervals SPX and SPY of a picture element in X and Y axial directions. The processor 3 further applies to the picture converter 2 a R/W (read-and-write) control signal (R/W CONTROL) which will be described later, and a horizontal synchronizing signal HD, a vertical synchronizing signal VD and a horizontal blanking signal HBLK which are produced in the processor 3, as control signals for extracting the above-mentioned picture element data. In response to these data and control signals, the picture converter 2 extracts predetermined picture element data from the high resolution picture to be applied to the picture processor 3.

The sampling interval is a numerical value which is produced by adding "1" to a number of picture elements of an object thinned-out between the picture elements to be extracted. The extraction of picture element data is subsequently executed for each sampling interval starting from the above-mentioned specified picture element (called as "specific picture element" hereinafter).

For instance, if "4" is designated as sampling intervals SPX and SPY, picture element data is extracted every four picture elements in both X and Y axial directions as shown at (1) of FIG. 2. If both sampling intervals SPX and SPY are "1", the respective picture element data is subsequently and continuously extracted from the specific picture element P without thinning out picture elements as shown at (2) of FIG. 2.

Figure 3:
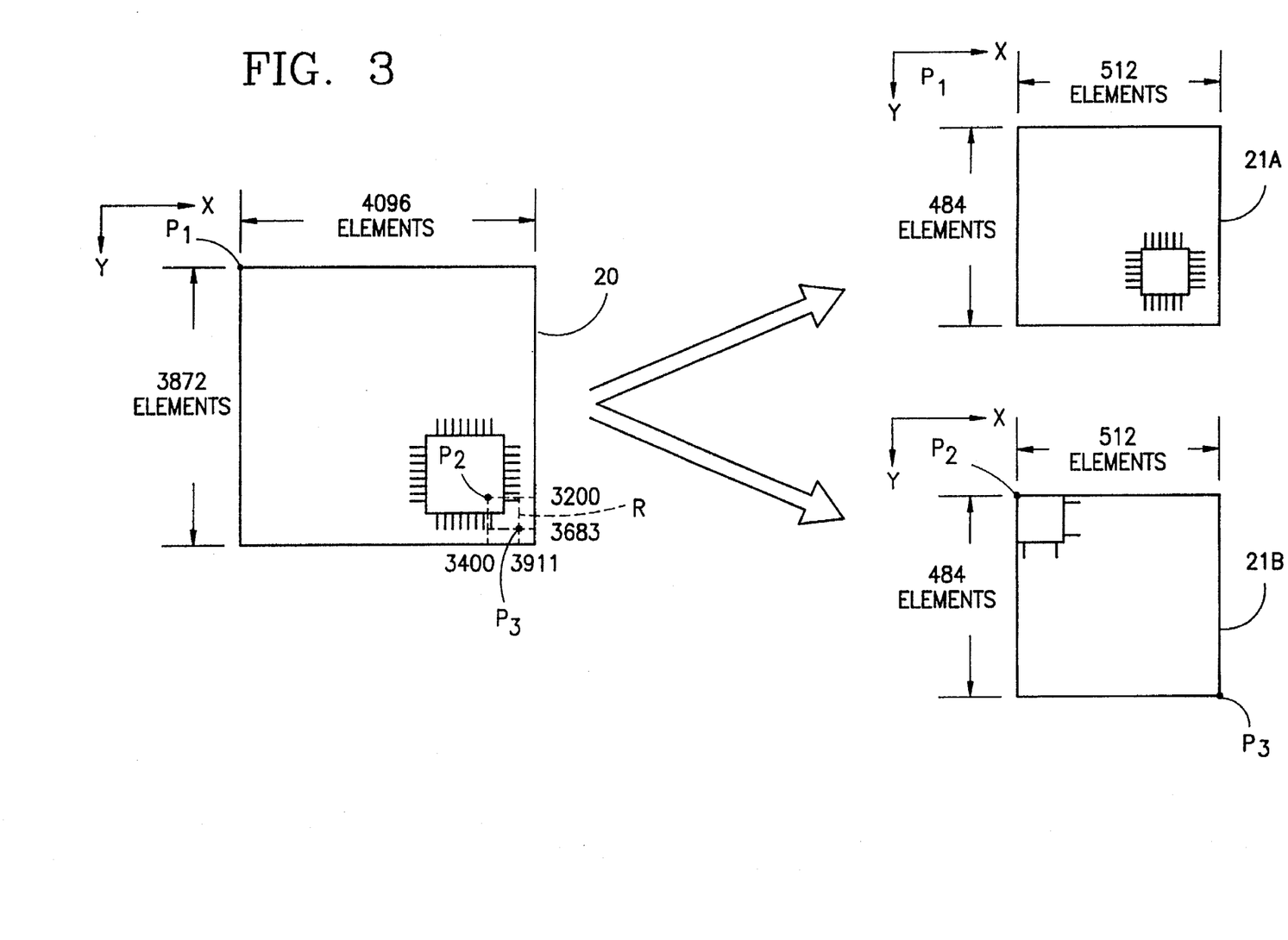
FIG. 3 shows one example of conversion of a picture.

FIG. 3 shows one example of conversion of a picture according to the above-described extraction of picture element data. There are shown a high resolution picture 20 entered into the picture converter 2, and pictures 21A and 21B produced by extracting a predetermined picture element from the high resolution picture.

When a picture element $P_1$ located at the coordinates (0, 0) within the high resolution picture 20 is designated as a specific picture element and "8" is designated as sampling intervals SPX and SPY in X and Y axial directions, extraction of picture element data is executed every eight picture elements in both X and Y axial directions starting from the picture element $P_1$. Accordingly 512 picture elements in the X axial direction and 484 picture elements in the Y axial direction are extracted from the whole of the picture 20, and the picture 21A in which the whole of the picture 20 is shrunk to a sixty-fourth resolution is produced.

When a picture element $P_2$ located at the coordinates (3400, 3200) within the high resolution picture 20 is designated as a specific picture element and "1" is designated as sampling intervals SPX and SPY in X and Y axial directions, picture data of 512 picture elements in the X axial direction and 484 picture elements in the Y axial direction starting from the picture element $P_2$ are continuously extracted. Thus, the picture data within a rectangular section R specified by the picture element $P_2$ and a picture element $P_3$ located at the coordinate (3911, 3683) is extracted to produce the picture 21B.

Figure 4:
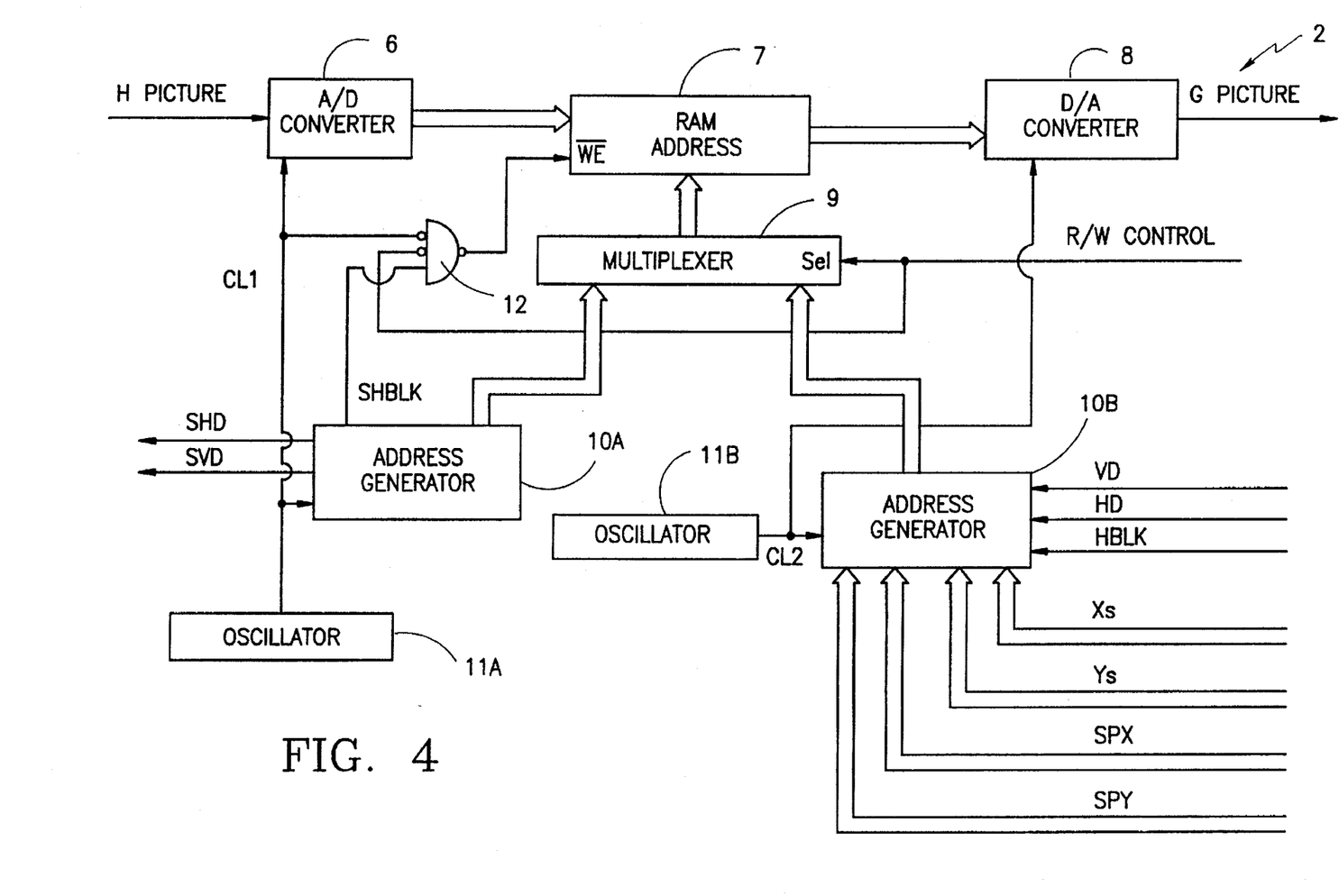
FIG. 4 is a circuit block diagram of a picture converter.

FIG. 4 shows a circuit block diagram of the picture converter 2.

The picture processor 3 produces the horizontal synchronizing signal HD, the vertical synchronizing signal VD and the horizontal blanking signal HBLK, and the picture converter 2 produces the horizontal synchronizing signal SHD, the vertical synchronizing signal SVD and a horizontal blanking signal SHBLK for exclusive use.

The picture converter 2 is provided with an A/D (analog-to-digital) converter 6, a RAM (random access memory) 7, a D/A (digital-to-analog) converter 8, a multiplexer 9, first and second address generators 10a and 10b, a pair of oscillators 11a and 11b, and a NAND gate 12.

The A/D converter 6 extracts a high resolution picture signal from the camera 1 in accordance with a clock signal CL1 generated from the oscillator 11a and converts the analog picture data at each extracting time point to a digital signal. The digital picture element data produced by the above conversion is subsequently stored into the RAM 7.

The first address generator 10a is disposed to determine picture element addresses of the respective picture element data entered from the camera 1, and to subsequently produce X-and-Y coordinates of the respective picture elements in accordance with the timing of an output operation about the picture element data of the A/D converter 6 upon the entry of the clock signal CL1 from the oscillator 11a. The address generator 10a is provided with a function for producing a synchronizing signal, and generates the synchronizing signals SHD and SVD and the horizontal blanking signal SHBLK in accordance with the producing timing of the above-mentioned position data.

The second address generator 10b produces position data of picture elements to be extracted from the RAM 7 based on the position data (Xs, Ys) of the specific picture element and the data of the sampling interval SPX in the X-axial direction and the sampling interval SPY in the Y-axial direction which are entered from the picture processor 3. This extraction of picture data is subsequently performed in accordance with the timing of the clock signal CL2 from the oscillator 11b and the synchronizing signals HD and VD and horizontal blanking signal HBLK from the picture processor 3.

The R/W control signal R/W CONTROL is always applied to the multiplexer 9 at a level "H" or "L" to switch an output of the multiplexer. The multiplexer 9 is applied by position data for writing and reading from first and second address generators 10a and 10b respectively. The multiplexer applies the position data from the first address generator 10a to the RAM 7 when the R/W control signal is "L", and the position data from the second address generator 10b to the RAM 7 when the R/W control signal is "H".

The NAND gate 12 is disposed to receive a reversed signal of the R/W control signal, a reversed signal of the clock signal CL1, and a horizontal blanking signal SHBLK for exclusive use from the address generator 10a to control a writable condition in the RAM 7. When the R/W control signal R/W CONTROL is "L" and the horizontal blanking signal SHBLK is "H", the NAND gate 12 produces an output synchronizing with the clock signal CL1. When the output of the NAND gate 12 is "L", a write enable signal is a logic "1" so that the RAM 7 is possible to be written with the picture element data from the A/D converter 6. As described above, the multiplexer 9 applies the position data from the address generator 10a to the RAM 7 to be stored in the RAM corresponding to the picture element data.

When the R/W control signal R/W CONTROL is "H", the output from the NAND gate is always "H" and the write enable signal becomes a logic "0" to hold the stored data in the RAM 7, in which the RAM 7 is supplied with the position data from the second address generator 10b and the picture element data corresponding to the position data is applied to the D/A converter 8.

The D/A converter 8 is disposed to produce analog general purpose picture signal G PICTURE by employing the respective picture element data produced from the RAM 7, and the general purpose picture signal G PICTURE is applied to the picture processor 3 for predetermined picture processing.

Figure 5:
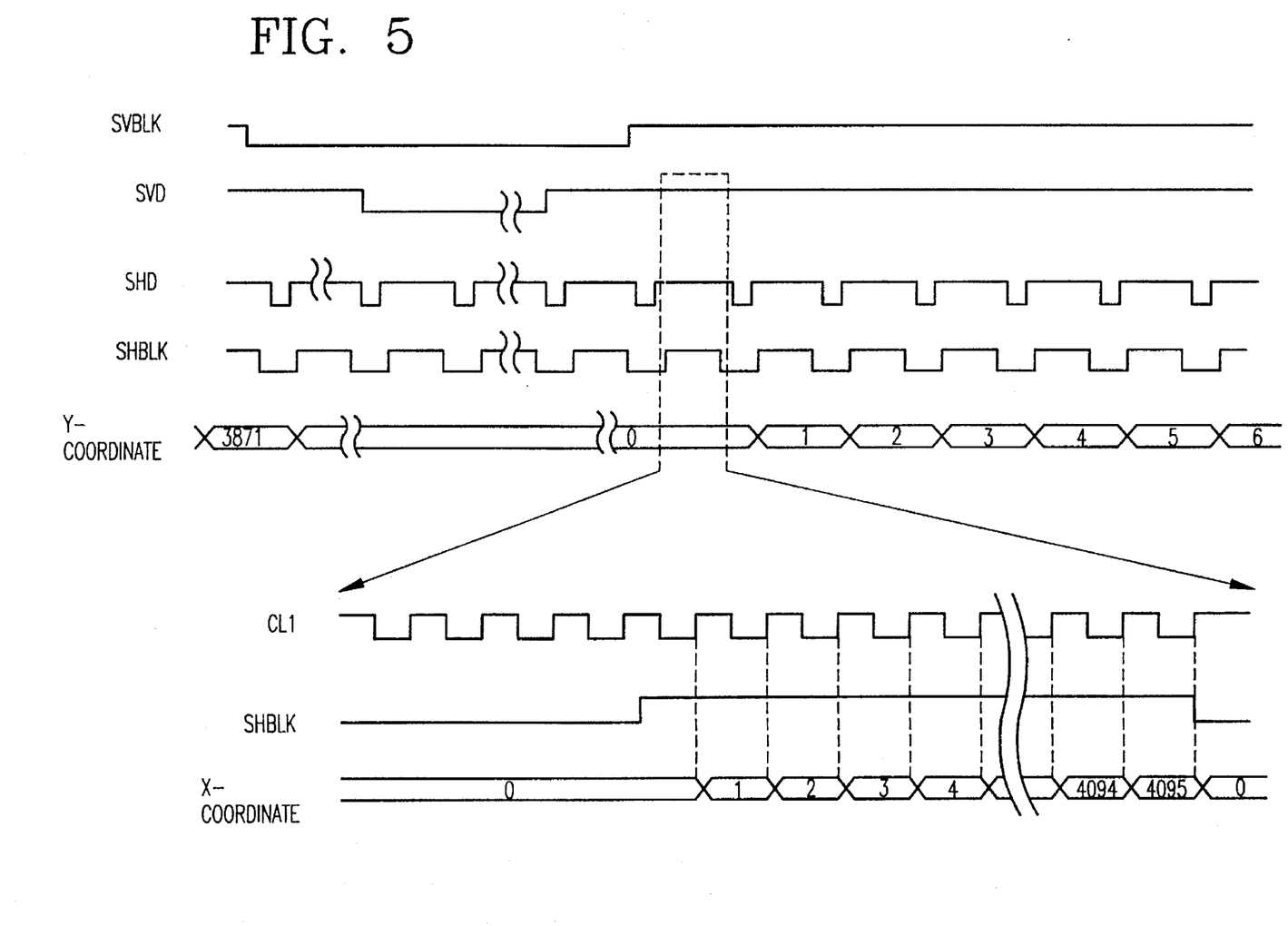
FIG. 5 is a timing chart showing an operation in a first address generator of FIG. 4.

FIG. 5 shows a producing process of position data and synchronizing signals by the first address generator 10a.

As the vertical blanking signal SVBLK produced in the address generator 10a rises in a predetermined time period after a rise of the above-mentioned vertical synchronizing signal SVD, a producing operation for X and Y coordinate values is initiated. In an initial state both of X and Y coordinate values are set to an initial value "0".

Upon a rise of the first horizontal synchronizing signal SHD and the horizontal blanking signal SHBLK, the X-coordinate value is incremented by "1" from the initial value "0" synchronizing with the subsequent clock signal CL1. As the X-coordinate value reaches "4095", the horizontal blanking signal SHBLK and the horizontal synchronizing signal SHD fall one after another and the X-coordinate is set to the initial value "0".

After reset of the X-coordinate value, the Y-coordinate value is incremented by "1" by the horizontal synchronizing signal SHD which has risen again. About this Y-coordinate value, the X-coordinate values from "0" to "4095" are subsequently produced synchronizing with the clock signal CL1.

Likewise the X-coordinate and the Y-coordinate are subsequently produced. When the last position data (4095, 3871) is produced, the vertical blanking signal SVBLK and the vertical synchronizing signal SVD subsequently fall and a series of operations are completed.

Figure 6:
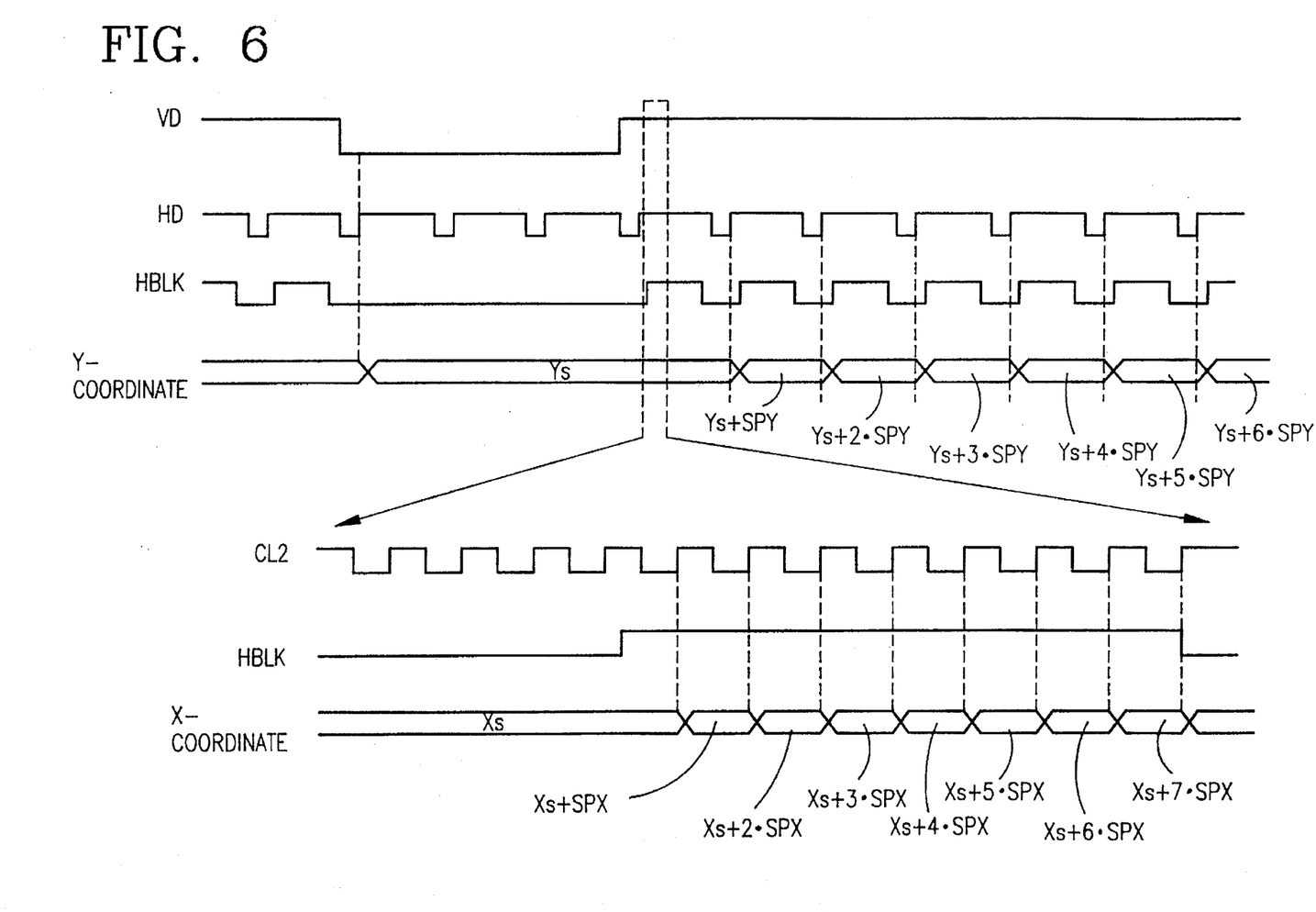
FIG. 6 is a timing chart showing an operation in a second address generator of FIG. 4.

FIG. 6 shows a producing process of position data by the second address generator 10b.

In the second address generator 10b, coordinates (Xs, Ys) of a specific picture element designated by the picture processor are set as an initial value. Thereafter, an X coordinate value and a Y coordinate value are incremented based on the respective sampling intervals SPX and SPY applied from the picture processor according to the respective synchronizing signals and the clock signal CL2.

Upon subsequent rises of the horizontal synchronizing signal HD and the horizontal blanking signal HBLK after a rise of the vertical synchronizing signal VD, the X-coordinate value is incremented by each sampling interval SPX synchronizing with the clock signal CL2. Likewise the X coordinate is incremented until the horizontal blanking signal HBLK from the picture processor falls, whereby position data of 512 picture elements is produced. Upon a fall of the horizontal blanking signal HBLK, the X-coordinate is reset to an initial value Xs.

Upon a rise of the subsequent horizontal synchronizing signal HD, the Y-coordinate is incremented based on the above-mentioned sampling interval SPY, and likewise X coordinate value is subsequently added by a value of the sampling interval SPX in accordance with the clock signal CL2.

Likewise the Y-coordinate and the X-coordinate are incremented and position data for extracting picture element data is produced until the vertical synchronizing signal VD falls.

Figure 7:
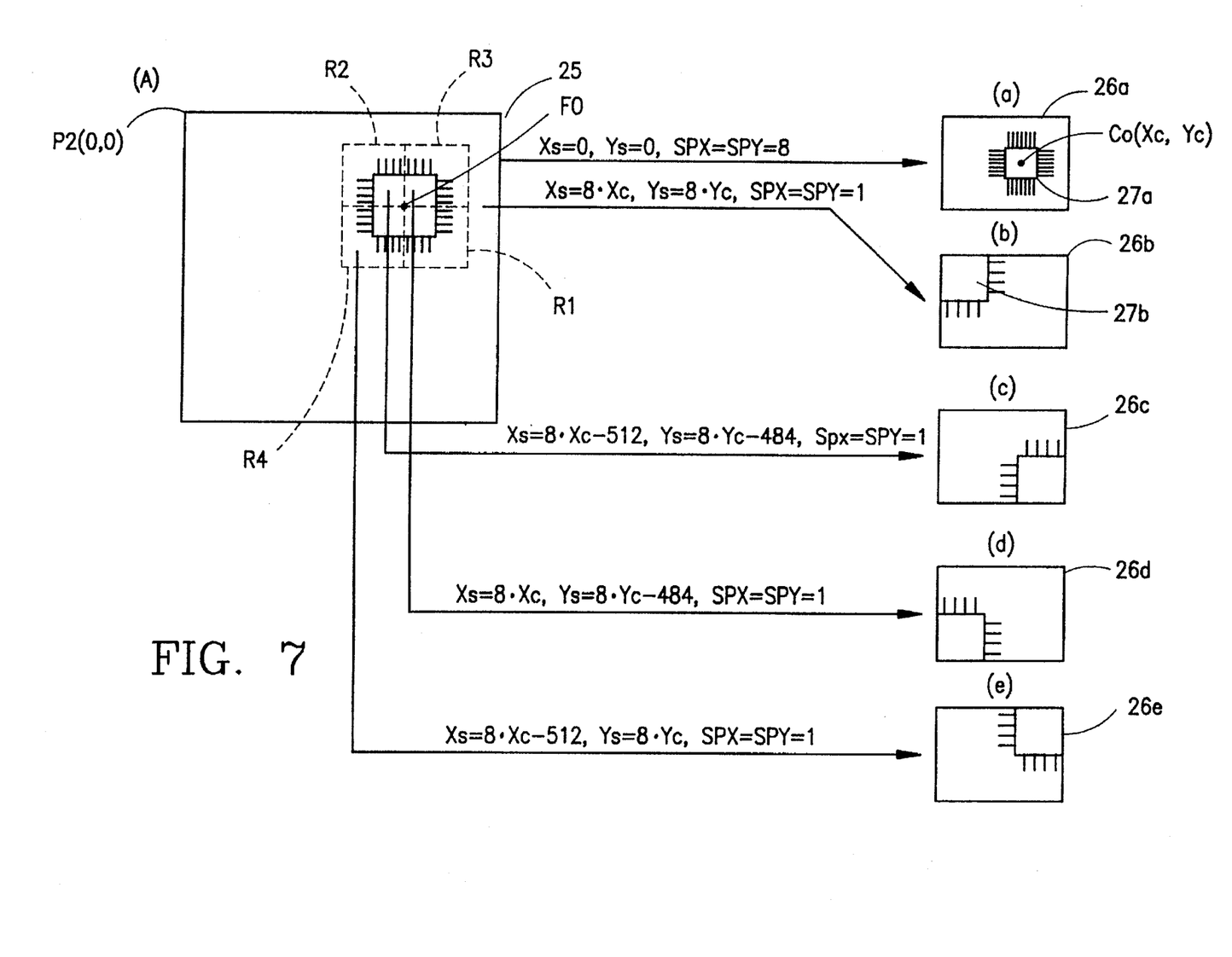
FIG. 7 illustrates one example of an extracting operation for picture to inspect a lead interval of a QFP.

FIG. 7 shows at (A) a high resolution picture 25 obtained in an inspection process of pin intervals of a QFP and at (a) to (e) various examples of a picture extracted from the high resolution picture 25 to explain an inspection process.

As the high resolution picture 25 is stored in the RAM 7 of the picture converter 2 according to the process of FIG. 5, an operator designates through the operation unit 5 the picture element $P_1$ at the coordinate (0, 0) as a specific picture element, and "8" as the sampling intervals SPX and SPY. The data is entered to the picture processor 3 to be applied to the picture converter 2 to extract picture element data every eight picture elements in both X and Y axial directions starting from the picture element $P_1$ from the high resolution picture 25 within the RAM 7. Accordingly, there is produced a picture 26a in which the whole of the high resolution picture 25 is converted into a low resolution.

The picture processor 3 reads the low resolution picture 26a to extract a picture 27a of the QFP, and computes a position (Xc, Yc) of a picture element $C_0$ located at a center of the picture 27a. The position and the coordinates of the picture element $C_0$ are displayed on the monitor 4 together with the low resolution picture 26.

Upon the confirmation of the display, the operator selects a picture element $F_0$ corresponding to the displayed picture element $C_0$ as a specific picture element within the high resolution picture 25 to enter the coordinates (8·Xc, 8·Yc) through the operation unit 5. As the operator further enters "1" as sampling intervals SPX and SPY, picture data in a section R1 including a right-and-lower quarter of the picture of the QFP is extracted and applied to the picture processor 3.

The picture processor 3 reads its picture 26b to obtain whole picture data in the section R1 and further a picture portion 27b of the QFP in the picture 26b for inspecting a predetermined inspection area set at a picture portion of pins. A result of the inspection is displayed on the monitor 4 together with the converted picture 26b.

Upon completion of inspection about the section R1, the operator enters coordinates (8·Xc-512, 8·Yc-412) as position data of a specific picture element and "1" as sampling intervals SPX and SPY. Thus, as shown at (c) of FIG. 7, picture data of section R2 including a left-and-upper quarter of the picture of the QFP is extracted. The extracted picture 26c is applied to the picture processor 3 for same inspection as the above-mentioned inspection.

Likewise, coordinates (8·Xc, 8·Yc-484) and (8·Xc-512, 8·Yc) are designated as position data of a specific picture element, and "1" is designated as sampling intervals SPX and SPY, so that picture data at sections R3 and R4 including a right-and-upper quarter and a left-and-lower quarter of a picture of the QFP is extracted to produce pictures 26d and 26e as shown at (d) and (e) of FIG. 7 for a predetermined processing.

Thus, after the whole of a picture is converted into a low resolution picture and a section subject to picture processing is defined, whole picture element data within the picture processing subject section is extracted so that detailed picture processing can be executed. According to this method, it is not necessary to process all of high resolution picture data, so that the processing can be quickened and the manufacturing cost is reduced.

Though data about a specific picture element and a sampling interval is entered through the operation unit 5 in this embodiment, such designated data may be automatically transmitted to the picture converter 2 from the picture processor 3 based on previously taught data.

Though the picture processing system of this embodiment is designed to inspect components mounted on a printed circuit board, it may be used for inspecting a microscopic object or a precision instrument and applied to various objects other than inspection.

While the invention has been described and illustrated with respect to certain embodiments which give satisfactory results, it will be understood by those skilled in the art, after understanding the purpose of the invention, that various other changes and modifications may be made without departing from the spirit and scope of the invention, and it is therefore, intended in the appended claims to cover all such changes and modifications.

What is claimed is:

1. A method for processing a picture having a higher resolution than a predetermined resolution of a picture which can be processed by a picture processor, said method comprising the steps of:
    designating a specific picture element and a sampling interval for extracting predetermined picture elements from said higher resolution picture;
    extracting said predetermined picture elements, including said specific picture element, said extracted predetermined picture elements having a number of picture elements corresponding to the processor's picture processing resolution and said designated sampling interval; and
    processing with said processor a picture formed by said extracted predetermined picture elements.

2. A picture processing system according to claim 1, where an operator designates said specific picture element.

3. A picture processing system according to claim 2, where an operator designates said sampling interval.

4. A picture processing system according to claim 3, where said sampling intervals are uniform.

5. A picture processing system according to claim 3, where said sampling interval is used to select samples in horizontal lines of said higher resolution picture.

6. A picture processing system according to claim 5, where said sampling interval is further used to select samples in vertical rows of said higher resolution picture.

7. A picture processing system comprising:
    a picture processor for processing a picture having a predetermined picture resolution;
    said picture processor including designating means for designating a specific picture element and a sampling interval for extracting predetermined picture elements from a high resolution picture having a resolution higher than said predetermined picture resolution;
    a picture converter for producing picture data having said predetermined resolution from picture data having said higher resolution;
    said picture converter including:
    picture input means for entering said higher resolution picture data;
    storage means for storing said higher resolution picture data entered by said picture input means;
    picture converting means for extracting said predetermined picture elements, including said specific picture element, at a predetermined lower resolution based on the resolution capability of the processor and the sampling interval designated by said designating means of said picture processor from the picture stored in said storage means to produce a picture to be processed; and
    picture output means for applying the picture data produced by said picture converting means to said picture processor.

8. A picture processing system according to claim 7, where an operator designates said sampling interval.

9. A picture processing system according to claim 8, where said sampling intervals are uniform.

10. A picture processing system according to claim 9, where said sampling interval is used to select samples in horizontal lines of the higher resolution picture.

11. A picture processing system according to claim 10, where said sampling interval is further used to select samples in vertical rows of the higher resolution picture.

12. A picture processing system comprising:
    a picture processor for processing a picture having a predetermined resolution;
    said picture processor including means for designating a specific picture element and a sampling interval for extracting predetermined picture elements from a high resolution picture which has a picture resolution higher than said predetermined resolution;
    a camera for producing said high resolution picture; and
    a picture converter interposed between said picture processor and said camera;
    said picture converter including picture input means for entering the high resolution picture from said camera;
    storage means for storing said high resolution picture entered by said picture input means;
    picture converting means for extracting said predetermined picture elements, including said specific picture element, said predetermined picture elements having a number of picture elements corresponding to the sampling interval designated by said picture processor, said predetermined picture elements forming a picture to be processed from the picture stored in said storage means; and
    picture output means for applying the picture produced by said picture converting means to said picture processor.

13. A picture processing system according to claim 12, in which said storage means stores each picture element of said high resolution picture with corresponding picture element position data, and said picture converting means is further provided with extracting means for subsequently extracting said predetermined picture elements from said stored high resolution picture;
    position data producing means for producing position data of each picture element in accordance with the extracting operation of said picture element extracting means; and
    output means for simultaneously applying to said storage means the picture element data extracted by said picture element data extracting means and the position data produced by said position data producing means.

14. A picture processing system according to claims 12 or 13, in which said picture processor is further provided with synchronizing signal producing means for generating synchronizing signals in horizontal and vertical directions, and said picture converting means of said picture converter is further provided with synchronizing signal input means for entering the synchronizing signals generated by said synchronizing signal producing means; position data producing means for subsequently producing position data of the respective picture elements based on the specific picture elements and the sampling intervals designated by said designating means in accordance with the entered synchronizing signals; and picture element data extracting means for subsequently extracting picture element data based on the respectively produced position data from said storage means.

15. A picture processing system according to claim 12, in which said camera, said picture converter and said picture processor are installed into a board inspection device for inspecting a mounting status of electronic components mounted on a printed circuit board.

16. A picture processing system comprising:

a picture processor for processing a picture having a first resolution; and digital processing means for receiving a first digital picture corresponding to a picture having a second resolution higher than said first resolution and for choosing a predetermined number of picture elements from said first digital picture as determined by a picture element and a sampling interval designated by the picture processor to produce a second digital picture having picture elements corresponding to said first resolution for application to said picture processor to be processed thereby.

17. A picture processing system according to claim 16 further comprising an A/D converter for converting a first analog picture having said second resolution to said first digital picture and a D/A converter for converting said second digital picture produced by said digital processing means to a second analog picture to be applied to said picture processor for processing.

18. A picture processing system according to claim 16 further comprising designating means for designating a sampling interval and picture converting means for extracting said second digital picture based on the designated sampling interval.

* * * * *